US006937921B1

(12) United States Patent
Mazumder

(10) Patent No.: US 6,937,921 B1
(45) Date of Patent: Aug. 30, 2005

(54) PRODUCTION OF SMART DIES AND MOLDS USING DIRECT METAL DEPOSITION

(75) Inventor: Jyoti Mazumder, Ann Arbor, MI (US)

(73) Assignee: Precision Optical Manufacturing (POM), Troy, MI (US)

( * ) Notice: Subject to any disclaimer, the term of this patent is extended or adjusted under 35 U.S.C. 154(b) by 430 days.

(21) Appl. No.: 09/526,631

(22) Filed: Mar. 16, 2000

Related U.S. Application Data

(63) Continuation-in-part of application No. 09/107,912, filed on Jun. 30, 1998, now Pat. No. 6,122,564.
(60) Provisional application No. 60/156,193, filed on Sep. 27, 1999.

(51) Int. Cl.[7] .............................................. G06F 19/00
(52) U.S. Cl. ........................ 700/166; 700/123; 700/182
(58) Field of Search ................................ 700/166, 123, 700/109, 119, 182, 219, 197–205

(56) References Cited

U.S. PATENT DOCUMENTS

| | | | |
|---|---|---|---|
| 4,044,774 A | 8/1977 | Corbin et al. ................ 607/117 |
| 4,323,756 A | 4/1982 | Brown et al. .......... 219/121.66 |
| 4,411,258 A | 10/1983 | Pujals, Jr. .................... 601/134 |
| 4,493,362 A * | 1/1985 | Moore et al. ................ 164/457 |
| 4,626,999 A | 12/1986 | Bannister .................... 700/166 |
| 4,633,889 A | 1/1987 | Talalla et al. ............... 607/117 |
| 4,724,299 A | 2/1988 | Hammeke ................ 219/121.6 |
| 4,803,986 A | 2/1989 | Dufresne et al. ........... 607/115 |
| 4,915,757 A | 4/1990 | Rando .......................... 156/64 |
| 5,031,618 A | 7/1991 | Mullett ........................ 607/46 |
| 5,041,974 A | 8/1991 | Walker et al. ................ 607/63 |
| 5,062,786 A * | 11/1991 | Arai ............................ 425/174 |
| 5,196,015 A | 3/1993 | Neubardt ..................... 606/61 |
| 5,278,442 A * | 1/1994 | Prinz et al. ................. 257/417 |
| 5,303,141 A | 4/1994 | Batchelder et al. ........... 700/29 |
| 5,316,707 A | 5/1994 | Stanciu et al. ............. 264/40.1 |
| 5,342,409 A | 8/1994 | Mullett ........................ 607/46 |
| 5,358,513 A | 10/1994 | Powell, III et al. ........... 607/48 |
| 5,423,877 A | 6/1995 | Mackey ..................... 607/117 |
| 5,440,300 A * | 8/1995 | Spillman ................. 340/10.34 |
| 5,456,870 A | 10/1995 | Bulgrin ..................... 264/40.6 |
| 5,474,558 A | 12/1995 | Neubardt ..................... 606/79 |
| 5,501,703 A | 3/1996 | Holscheimer et al. ........ 607/46 |
| 5,591,385 A | 1/1997 | Arai et al. ................. 264/40.6 |
| 5,612,887 A | 3/1997 | Laube et al. ................ 700/119 |
| 5,642,287 A | 6/1997 | Sotiropoulos et al. ...... 700/166 |
| 5,643,330 A | 7/1997 | Holscheimer et al. ........ 607/46 |

(Continued)

OTHER PUBLICATIONS

W.M. Steen, "Laser Material Processing," 1998 Springer, Chap. 7 & 8 (pp. 272–320).

*Primary Examiner*—Leo Picard
*Assistant Examiner*—Chad Rapp
(74) *Attorney, Agent, or Firm*—Gifford, Krass, Groh, Sprinkle, Anderson & Citkowski, PC

(57) ABSTRACT

A laser-aided, direct metal deposition (DMD) fabrication process is used for dies and molds having integrated sensors for monitoring and controlling characteristics that determine the quality of an article being processed. A method of fabricating such devices, as well as the "smart" devices themselves are disclosed. A system of manufacturing articles uses smart dies or smart molds so that various characteristics that affect the quality of the finished article are monitored during the die-forming or injection-molding process. The sensors, which are an integral part of the product-shaping devices, include simple thermocouples for measuring the temperature in various locations, as well as piezoelectric sensors and strain gages to monitor the build-up of stress and strain history caused by fluctuations in temperature during the fabrication process. This information is transmitted to a computer, where it is analyzed or compared with standardized histories obtained either through calibration experiments or through theoretical calculations.

8 Claims, 5 Drawing Sheets

U.S. PATENT DOCUMENTS

| | | | |
|---|---|---|---|
| 5,659,479 A | 8/1997 | Duley et al. | 700/166 |
| 5,837,960 A | 11/1998 | Lewis et al. | 219/121.63 |
| 5,976,457 A * | 11/1999 | Amaya et al. | 419/36 |
| 6,122,564 A * | 9/2000 | Koch et al. | 700/123 |
| 6,224,816 B1 * | 5/2001 | Hull et al. | 264/401 |
| 6,391,251 B1 * | 5/2002 | Keicher et al. | 419/7 |
| 6,410,105 B1 * | 6/2002 | Mazumder et al. | 427/554 |

* cited by examiner

PRODUCTION OF SMART DIES AND MOLDS USING DIRECT METAL DEPOSITION

REFERENCE TO RELATED APPLICATIONS

This application claims priority of U.S. provisional patent application Ser. No. 60/156,193 filed Sep. 27, 1999, and is a continuation-in-part of co-pending U.S. patent application Ser. No. 09/107,912, filed Jun. 30, 1998 now U.S. Pat. No. 6,122,564.

FIELD OF THE INVENTION

In general, this invention relates to the production and method of production of smart dies and molds having integrated sensors for controlling temperature, distortion and/or stress, such dies and molds being preferably fabricated by a direct-metal deposition process.

BACKGROUND OF THE INVENTION

Real-time monitoring of dies and molds during service. i.e. during die casting or injection molding, has considerable advantages in terms of quality control and prevention of defects in the final product, as well as in terms of safety of the operation and cost reduction.

During aluminum die-casting, molten aluminum in the form of a liquid metal spray sometimes leaks out and jeopardizes the shop-floor safety, as well as being a major hazard for the operator. Apart from safety, such leaks have considerable cost consequences, because in addition to the direct material loss, other components in the vicinity may be damaged from contact with the liquid spray, and there must be a subsequent clean-up operation of the entire affected area. Leakage during injection molding of polymers has similar safety and cost and consequences.

Undesirable temperature fluctuations and asymmetric thermal loading that gives rise to stresses, distortions and stress concentrations are causes of subsequent failure of the articles produced by die-casting or injection molding methods. Uncontrolled temperature or stress histories may contribute to the formation defects, such as tiny cracks, bubbles and inclusions, which lead to premature failure of the article during its use or operation.

These problems are well recognized and several prior-art methods have been proposed to address them. Typically, the temperature distribution and pressure distribution of the material inside the mold are monitored at various locations and a supply flow rate of a coolant is maintained within required limits in order to avoid defects in the molded article, e.g., U.S. Pat. No. 5,316,707 to Stanciu et al.; U.S. Pat. No. 5,456,870 to Bulgrin; U.S. Pat. No. 5,591,385 to Arai et al.; and U.S. Pat. No. 5,951,163 to Jen et al. These inventions, however, while addressing some of the safety and quality control concerns, are not without disadvantages, such as cumbersome and expensive setups or manufacturing processes, long production times for these type of molds and dies, and a necessity for large inventory of spare parts and other components. For example, a plurality of sensors may have to be placed along the outside surface of the barrel of an injection molding in carefully ordered locations (e.g. Bulgrin, Jen et al.), or ultrasonic waveguides with buffer rods must pass through holes in the walls of the die or mold (e.g. Jen et al.), for the purpose of monitoring the temperature and other characteristics of the materials being processed. Such designs are not compatible with current agile manufacturing principles, and produce unacceptable delays in the time it takes to bring new products to market because of delays in manufacturing and setting up a mold or die that will effectively provide safety and quality control of the final product.

Additional background material can be found in "Laser Material Processing", W. M. Steen, 1998 Springer, Chapters 7 and 8 (pp. 272–320), which is incorporated herein by reference. Another patent providing relevant background information is U.S. Pat. No. 5,837,960 to Lewis et al.

SUMMARY OF THE INVENTION

This invention is directed to product-shaping and forming articles, such as dies and molds, including integral sensors for monitoring and controlling characteristics that determine the quality of the article being processed. The invention therefore encompasses the method of fabricating such articles, as well as the articles themselves, which can be considered "smart." The invention also resides in a system of manufacturing products using smart dies and smart molds, so that various characteristics that affect the quality of the finished product are monitored during the die-forming or injection-molding process.

The sensors, which are an integral part of the product-shaping articles, may include simple thermocouples for measuring the temperature in various locations, as well as piezoelectric sensors and strain gages to monitor the build-up of stress and strain history caused by uneven fluctuations in temperature during the fabrication process. This information is transmitted to a computer, where it is analyzed or compared with standardized histories obtained either through calibration experiments or through theoretical calculations.

The computer is connected with a feedback controller and a logic gate, which allow for corrective measures to be taken, such as increasing the flow of the coolant to drop the temperature to a desired level, or, in a worst case scenario, aborting the process to avoid catastrophic failure, or dispensing with the fabrication of a product unit which is predicted to be defective at the end of the process. The real-time monitoring and feedback control of the product-shaping process, whether it is die forming or injection molding, enhances safety and accident avoidance, while increasing the desired level of quality control for the fabricated articles.

In the preferred embodiment, the product-shaping apparatus, i.e. the die or mold, is fabricated through a laser-aided direct metal deposition technique (DMD), so that the sensors are built into the wall of the die or mold during the material deposition and are an integral part of the article. The preferred method is described in detail in Applicant's U.S. patent application Ser. No. 09/107,912, which is incorporated herein by reference. Important characteristics of the DMD method include the ability to control the height of the deposited layer from the melt pool for each pass of the laser beam through a feedback controller coupled with optoelectric sensors. The thickness of the deposited layers can be as small as a couple of hundred microns, and the final surface roughness is less than that.

Cooling channels for guiding the coolant through the product-shaping article and other features, which are part of the geometry or structure of the mold, such as holes, cavities, discontinuities, steps and corners, are also created during the same fabrication process. Some sensors, such as temperature sensors, may be fabricated in conjunction with the direct metal deposition fabrication of the die or mold itself, whereas other sensors may be pre-fabricated and then embedded during the metal deposition process in predetermined locations in the body of the product-shaping article.

A product-forming article having integral sensors (i.e., a smart die or mold) and cooling channels is part of an automated system for controlling the temperature, stress and strain during the shaping or forming of a product using the device. The system includes means of controlling the inlet flow of coolant and means for controlling or stopping the forming or injection process, the control being effected through a computer, which analyzes and evaluates the inputs from the sensors and transmits the resulting information to a flow controller and to a process controller or logic gate, so that appropriate action is taken on a continuous basis.

DETAILED DESCRIPTION OF THE INVENTION

According to this invention, sensors are integrated into the body of a mold or die during the fabrication thereof using a laser-aided direct metal deposition (DMD) system. The DMD process allows the mold or die (the "article") to be fabricated on a layer-by-layer basis and, when equipped with feedback monitoring and control, the dimensions and overall geometry of the fabricated article may be very tightly controlled.

The geometry of the article is provided by a computer-aided design (CAD) system. The deposition tool path is generated by a computer-aided manufacturing (CAM) system for CNC machining with post-processing software for deposition, instead of software for removal as in conventional CNC machining. CAM software interfaces with the feedback controller. Details of the DMD process can be found in U.S. patent application Ser. No. 09/107,912, which is fully incorporated herein by reference.

Figure 1:
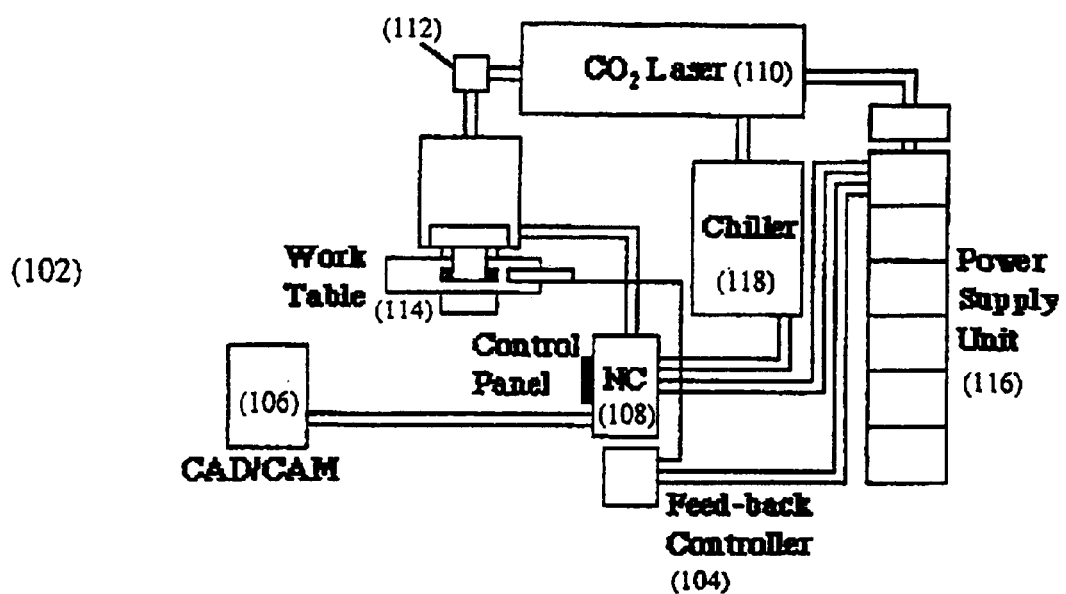
FIG. 1 shows a schematic of a laser-aided direct metal deposition system for fabricating product-shaping devices.
Figure 2:
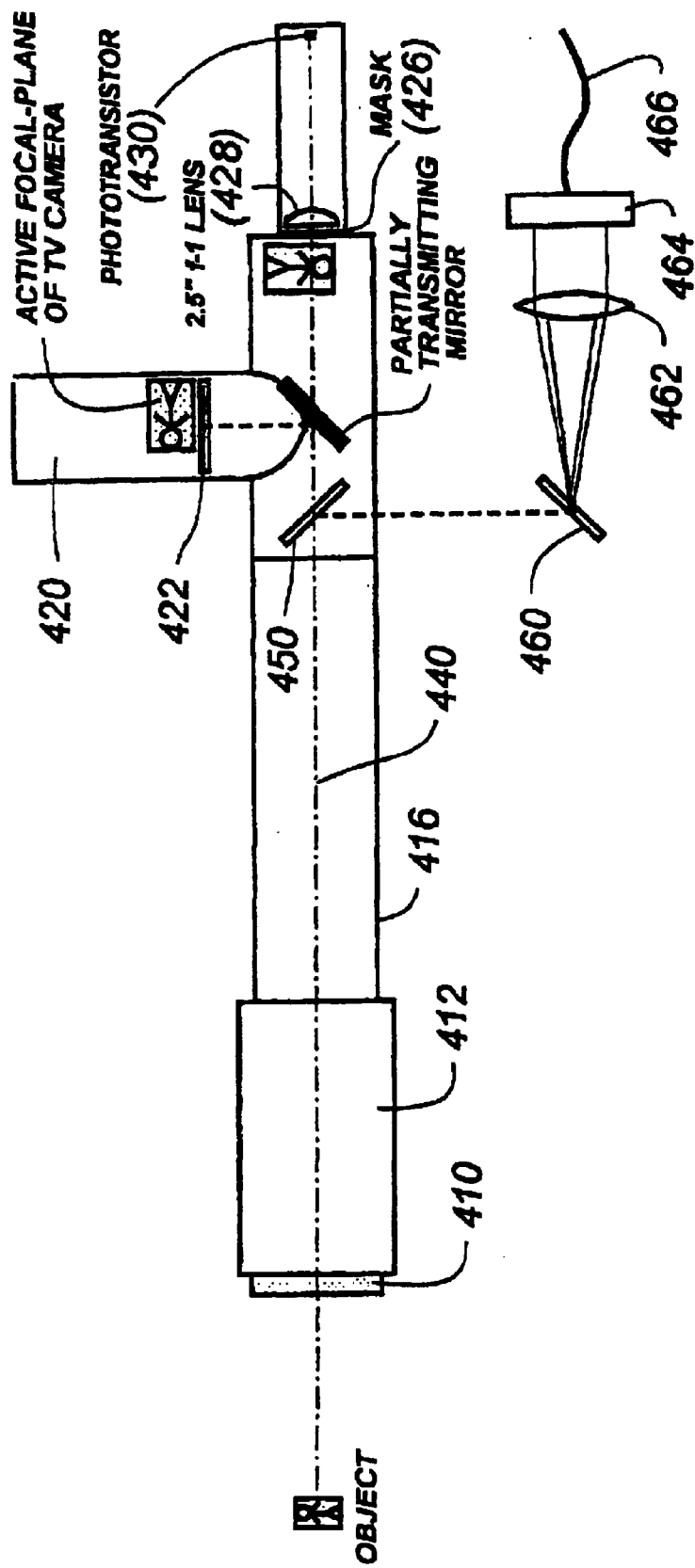
FIG. 2 shows a schematic of an optical monitoring system for a laser-aided direct metal deposition system and the important features of the feedback controller, to be used in fabricating product-shaping devices.

FIGS. 1 and 2 illustrate the laser-aided direct metal deposition (DMD) system which is the subject of commonly-owned U.S. patent application Ser. No. 09/107,912. FIG. 1 is a schematic of the DMD system 102 which includes a feedback controller 104 and a CAD/CAM system 106 for automated production of parts or products. The factors that affect the dimensions of material deposition include laser power, beam diameter, temporal and spatial distribution of the beam, interaction time, and powder flow rate. Adequate monitoring and control of laser power, in particular, has a critical effect on the ability to fabricate completed parts and products with complex geometries and within control tolerances. Accordingly, the feedback controller 104 of the DMD system typically cooperates directly with the numerical controller (NC) 108, which, itself, controls all functions of the DMD system, including laser power.

As shown in FIG. 1, the DMD system comprises a laser source 110 having an appropriate beam focusing means 112. The laser source is mounted above the substrate or workpiece in order to focus the laser beam on the working area, and the workpiece substrate is carried on a worktable 114. Either through the worktable 114 or through some other arrangement, the relative motion between the workpiece substrate and the laser beam and laser spray nozzle is controlled. A power supply unit 116 and a chiller 118 to cool the laser are part of the DMD system. The laser has sufficient density to create a melt pool with the desired composition of substrate or previously deposited layer and cladding powder. The cladding powder, typically metallic, is sprayed on the substrate preferably through a laser spray nozzle with a concentric opening for the laser beam, as described in U.S. Pat. No. 4,724,299, so that the powder exits the nozzle co-axially with the beam.

The numerical controller 108 controls all operating components of the DMD system of FIG. 1, including the operating conditions of the laser, receiving direction from the CAD/CAM computer 106 for building the part or product. The NC controller also receives feedback control signals from the feedback controller 104 to adjust laser power output, and further controls the relative position of the worktable and laser spray nozzle. The CAD/CAM system is equipped with software which enables it to generate a path across the substrate for material deposition. This feature makes it possible to execute rapid prototyping or to form a solid three-dimensional product directly from CAD specifications.

FIG. 2 shows schematically an optical monitoring system, which also illustrates the principles of the feedback control system of the DMD system. The optical control system is used to monitor optically and electronically a physical characteristic of the melt pool or of the deposited material layer, such as material composition, or physical dimension. The ability to control the height of the layer of material deposit, and to correct imperfections, makes the DMD method the preferred method for fabricating smart dies and molds, as well as any products with built-in integral sensors, and products with pipes, channels and other complex internal or external geometric features, also having non-uniform material composition.

A narrow-band pass filter 410 is placed in front of a camera lens 412. The image is passed through barrel extenders 416, after which a portion of the image (approximately 10 percent) is reflected to an active focal plane of a TV camera 420. The reflected image preferably passes through a neutral density filter 422 placed between the reflector and the active focal plane of the TV camera. The transmissive portion of the optical image passes through the reflector, and the magnified image is masked at a focal plane to provide partial resolution. The image exiting the mask 426 passes through a lens 428 and then to a light-sensitive device such as phototransistor 430. The optical axis 440 angle and the magnification of this optical train are arranged such that small changes in the height of the laser clad can be distinguished by the phototransistor 430.

Figure 3A:
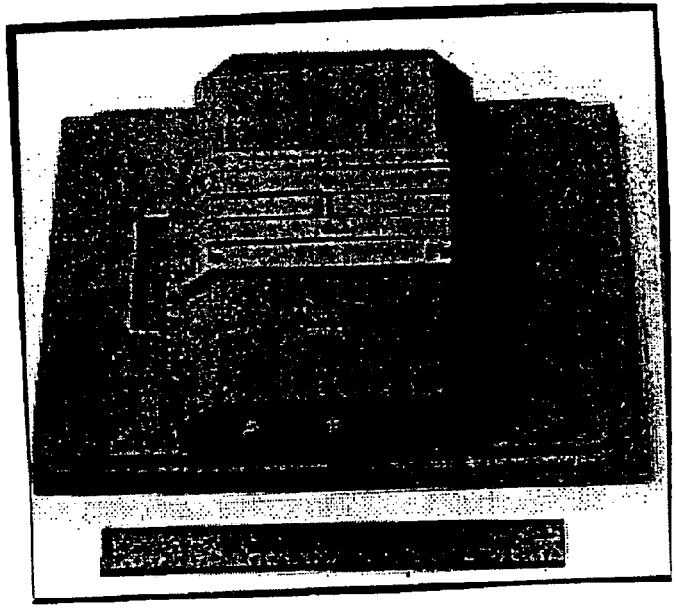
FIG. 3A shows the core part of a tool die without sensors fabricated by direct metal deposition.
Figure 3B:
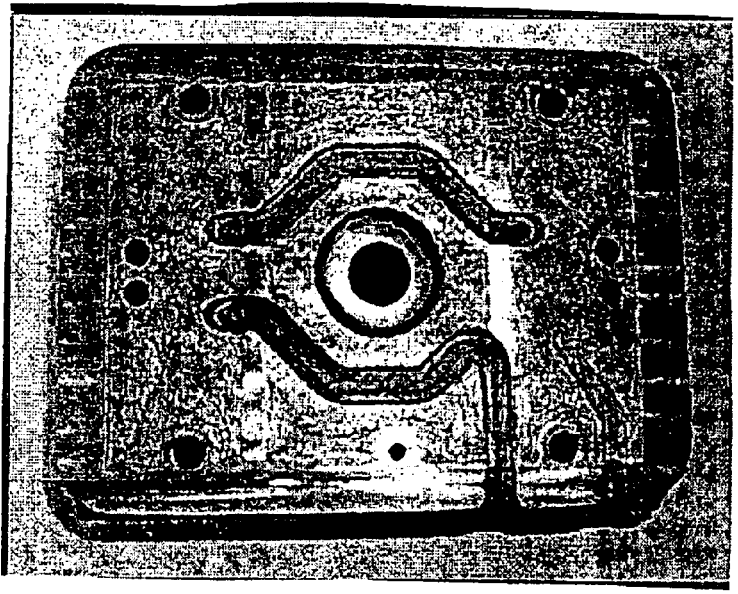
FIG. 3B shows the cavity part of a partially built tool die, revealing copper core and steel exterior, fabricated by direct metal deposition.

FIGS. 3A and 3B show a tool die fabricated by the DMD method. The die is made of H13 tool steel and has a copper chill block with embedded pipes as shown in FIG. 3A. FIG. 3B shows the cavity of the die and the cooling channels. This product does not include any built-in sensors, but illustrates the ability of the DMD method to create complex and multi-material three-dimensional objects with built-in cooling channels and pipes.

Figure 4:
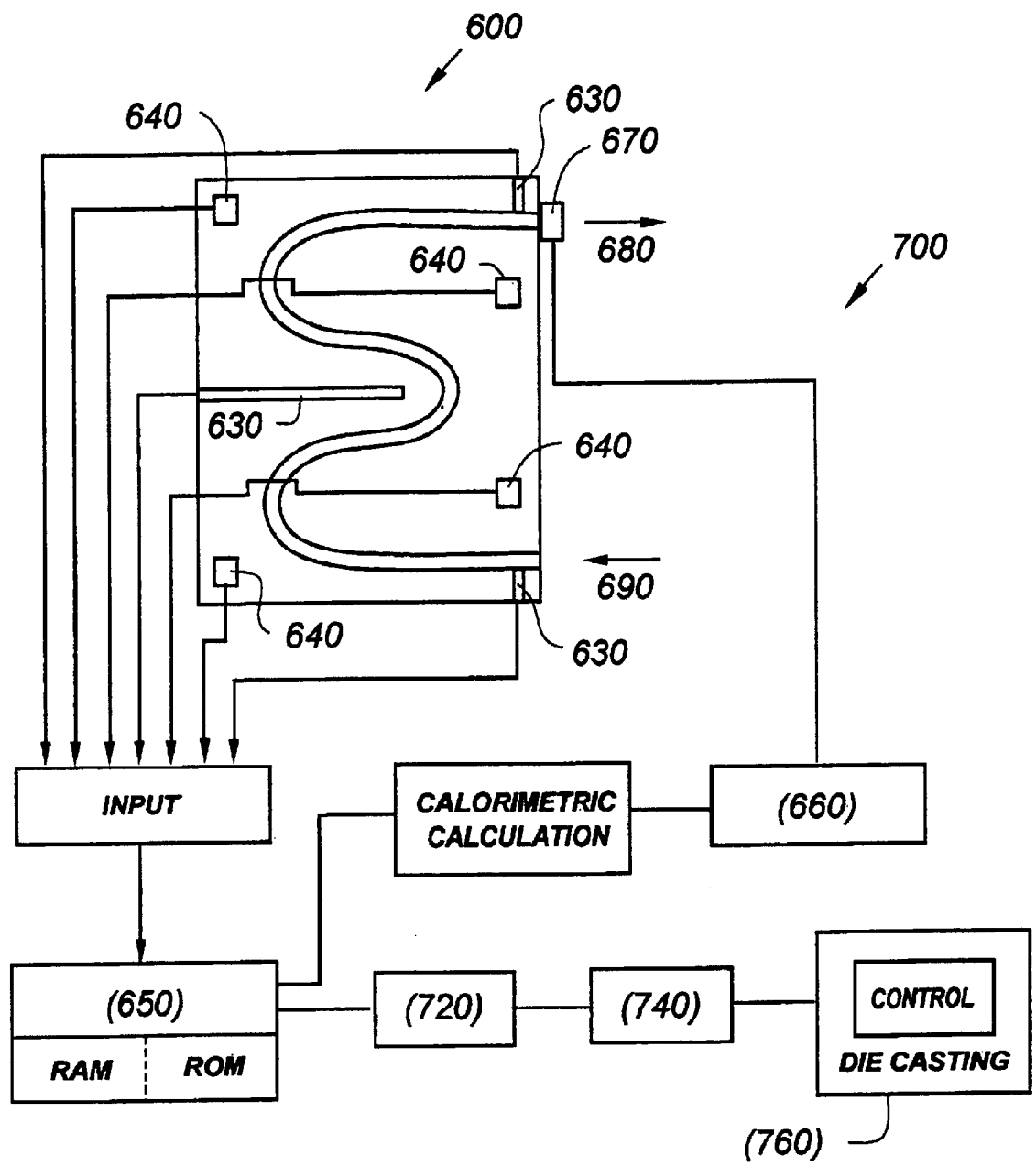
FIG. 4 shows a smart die and system for real-time monitoring and controlling the fabrication process and the characteristics of the fabricated article.

FIG. 4 shows a schematic diagram of a smart product-shaping device 600, which could be a die or mold, and the associated system 700 for monitoring and controlling temperature, stress and strain history, and water (or other coolant) flow. The die includes integral cooling channels 620, thermocouples 630, and other semiconductor temperature sensors 640, such as diodes, transistors and thermistors, for the purpose of measuring temperature at different locations within the mold or die. The thermocouples and the solid state electronic sensors provide reliable and consistent temperature measurements, which then serve as input for the computer 650.

In addition to temperature sensors, strain gages and piezoelectric devices are fabricated in critical sites of the product-shaping device to monitor the strain and stress development and accumulation, including stress concentrations, which are caused by non-uniform temperature fluctuations or other constraints and conditions that lead to the formation of residual stresses. These devices are not shown in FIG. 4, but their measurements are also fed to computer 650. The temperature, stress and strain histories received by the computer are compared with stored experimental or theoretical histories, which serve as the knowledge base and the standard model history for the processing and production of new products using the product-shaping apparatus 600.

Figure 5:
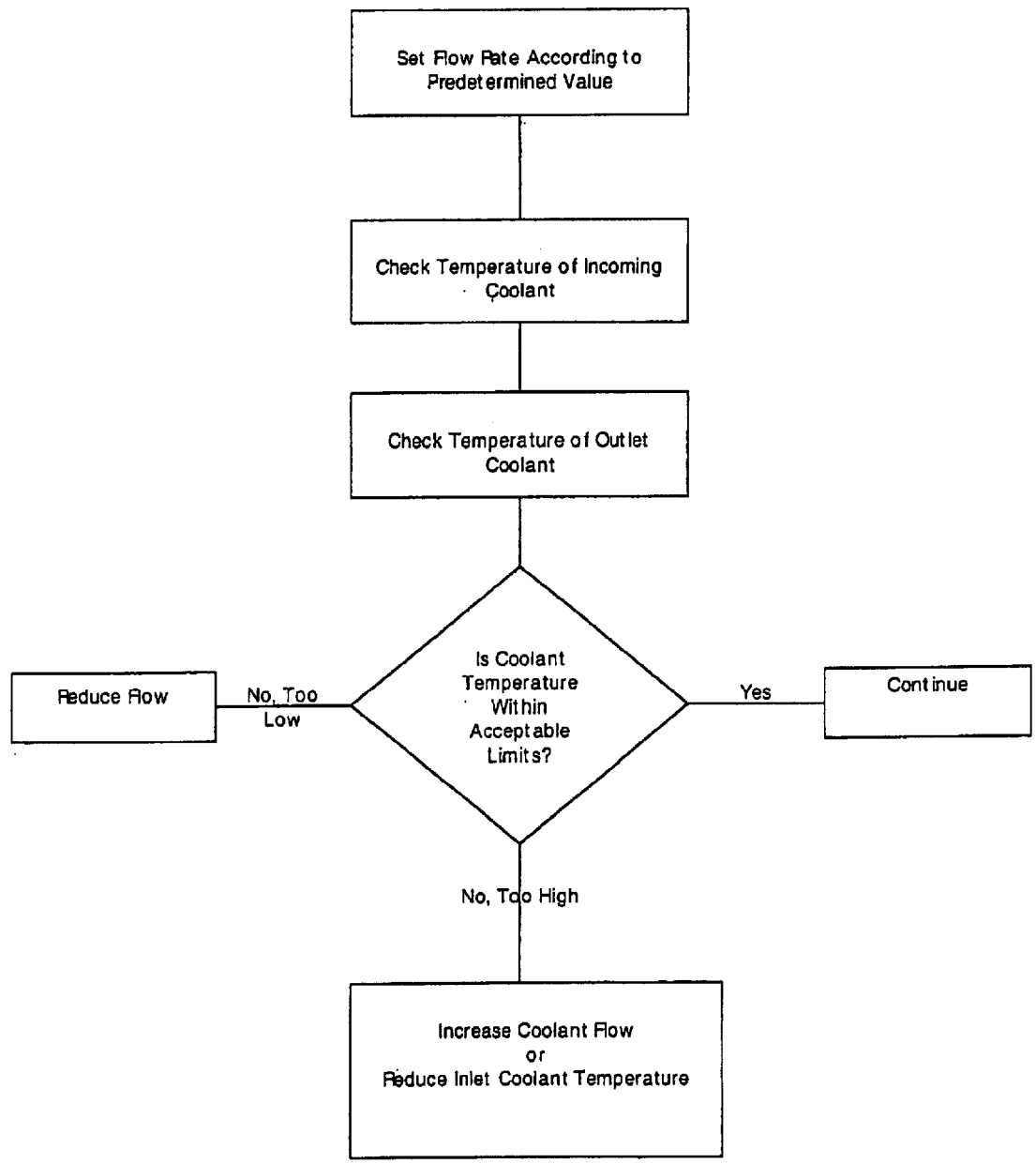
FIG. 5 is a flowchart of the logic of the flow rate controller.

The computer performs a calorimetric calculation and is interfaced with a coolant flow controller 660, which operates an electronic flow meter 670. The flow meter 670 adjusts the amount of coolant through the inlet 680 to the cooling channels. The logic of the coolant controller is shown in the flowchart of FIG. 5. First the flow rate of the incoming coolant is set at a predetermined value. Then the temperature of the incoming coolant is checked, followed by the temperature of the outgoing water. The controller then checks whether the difference in the temperature of the coolant between inlet 680 and outlet 690 sites, $\Delta T$, is within acceptable limits. If the temperature difference $\Delta T$ is within the predetermined limits, the process continues. If the temperature difference $\Delta T$ is too low in comparison with the acceptable limits, a signal is sent to the flow meter 670 to reduce the flow of the coolant. If the temperature difference is too high in comparison with the acceptable limits, a signal is sent to the flow meter 670 to increase the flow of the coolant or reduce the incoming coolant temperature. The inlet coolant flow is increased proportionately to the amount of heat that must removed from the mold or die. Alternatively, the temperature of the incoming coolant may be reduced proportionately to the amount of heat that must removed from the mold or die. The coolant is preferably water, but other fluids, such as ethylene glycol, can be used.

In addition to the calorimetric calculation that controls the coolant flow, the computer performs a stress and strain history comparison and, based on the results, a GO/NO GO signal is sent to logic gate 720. If the signal is "NO GO", a warning bell 740 is activated to alert the human operator, and the controller 760 stops the injection molding or die casting process. If the signal from the computer is "GO", no further action is taken, and the injection process or die casting proceeds as scheduled.

The method and system of fabricating dies and molds with integral sensors by the present invention can be also applied to other articles in which temperature or other type sensors are useful during actual operation or service. The present invention offers the advantage of creating "smart" products or devices, not limited to tools and industry components, but also including consumer goods, in one integrated operation which is fast, safe and accurate, and it serves the demands of rapid and just-in-time manufacturing. The materials that can be used include, but are not limited to tool steel, aluminum, copper, bronze, tin, nickel and ferrous alloys.

Already existing "smart" products or tools or metallic components or parts thereof, can also be improved, and may be fabricated more efficiently with reduction of time and cost and increased safety using the system and method of the invention, so that the required sensors are embedded in one integral fabrication operation through laser-aided direct metal deposition. New "smart" products or parts may be easily manufactured and brought to market by embedding the appropriate sensors into the body of the product or part during the fabrication process.

I claim:

1. Product-fabrication apparatus, comprising:
   a body constructed using a direct metal deposition process of a type wherein material layers are added in controlled succession, the body including a product shaping or forming portion, and a surrounding portion, the surrounding portion including:
   a) a plurality of integrated sensors, each outputting an electrical signal which is a function of temperature, and
   b) integral cooling channels having at least one inlet and one outlet for a flow of a coolant,
   a plurality of integrated sensors, each outputting an electrical signal which is a function of strain.

2. The apparatus of claim 1, wherein at least one of the strain sensors is embedded within the surrounding portion.

3. The apparatus of claim 1, wherein at least one of the strain sensors is fabricated during the fabrication of the body using the direct metal deposition process.

4. An automated system for real-time monitoring and controlling the temperature of an article during its fabrication, the system comprising:
   product-shaping apparatus, including:
   a body constructed using a direct metal deposition process of a type wherein material layers are added in controlled succession, the body including a product shaping or forming portion, and a surrounding portion, the surrounding portion including:
   a) a plurality of integrated sensors, each outputting an electrical signal which is a function of temperature, and
   b) integral cooling channels having at least one inlet and one outlet for a flow of a coolant;
   an electronic flow meter operative to adjust the inlet coolant flow by receiving a signal input from a feedback controller; and
   a computer receiving the outputs from the temperature sensors and interfacing with the feedback controller, the controller operating to adjust the temperature of the coolant by sending signal input to the flow meter.

5. An automated system for real-time monitoring and controlling the temperature, distortion and stress accumulation of an article during its fabrication, the system comprising:
   product-shaping apparatus, including:
   a body constructed using a direct metal deposition process of a type wherein material layers are added in controlled succession, the body including a product shaping or forming portion, and a surrounding portion, the surrounding portion including:
  a) a plurality of integrated sensors, each outputting an electrical signal which is a function of temperature;
  b) a plurality of integrated sensors, each outputting an electrical signal which is a function of strain;
  c) a plurality of integrated sensors, each outputting an electrical signal which is a function of stress, and
  d) integral cooling channels having at least one inlet and one outlet for a coolant, and an electronic flow meter operating to adjust the inlet coolant flow by receiving a signal input from a feedback controller; and a computer receiving the outputs from the temperature sensors, the stress sensors and the strain sensors, the computer interfacing with the feedback controller, the controller operating to adjust the temperature of the coolant by sending signal input to the flow meter, and operating to control the product-shaping process.

6. A method of fabricating a product, comprising the steps of:

providing a computer database describing a product including one or more integrated sensors, each outputting an electrical signal indicative of a fabrication parameter; and fabricating the product using a laser-aided, computer-controlled direct metal deposition process in accordance with the computer database description.

7. The method of claim 6, wherein at least one of the sensors is a thermocouple.

8. The method of claim 6, including one or more sensors for monitoring temperature, stress and strain.

* * * * *